United States Patent
Chaudhuri et al.

(10) Patent No.: US 9,788,325 B2
(45) Date of Patent: Oct. 10, 2017

(54) METHODS AND SYSTEMS FOR RADIO CARRIERS MANAGEMENT IN A WIRELESS BROADBAND NETWORK

(71) Applicant: Wipro Limited, Bangalore (IN)

(72) Inventors: Saptarshi Chaudhuri, Bangalore (IN); Irfan Baig, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 95 days.

(21) Appl. No.: 15/070,746

(22) Filed: Mar. 15, 2016

(65) Prior Publication Data

US 2017/0257866 A1 Sep. 7, 2017

(30) Foreign Application Priority Data

Mar. 1, 2016 (IN) .............................. 201641007222

(51) Int. Cl.
*H04W 72/04* (2009.01)
(52) U.S. Cl.
CPC ... *H04W 72/0453* (2013.01); *H04W 72/0486* (2013.01)
(58) Field of Classification Search
CPC ...................... H04W 72/0453; H04W 72/0486
See application file for complete search history.

(56) References Cited

U.S. PATENT DOCUMENTS

| | | | | |
|---|---|---|---|---|
| 9,629,103 B2* | 4/2017 | Kim | .............. | H04W 52/06 |
| 2010/0215011 A1* | 8/2010 | Pan | .............. | H04L 5/0064 370/329 |
| 2010/0246396 A1 | 9/2010 | Licardie et al. | | |
| 2011/0261704 A1* | 10/2011 | Etemad | .............. | H04W 52/0216 370/252 |
| 2012/0327878 A1 | 12/2012 | Pedersen et al. | | |
| 2013/0039344 A1* | 2/2013 | Lee | .............. | H04W 36/0055 370/331 |
| 2013/0107862 A1* | 5/2013 | Yang | .............. | H04L 5/001 370/331 |
| 2015/0271750 A1* | 9/2015 | Jung | .............. | H04L 25/4917 370/311 |
| 2015/0295832 A1 | 10/2015 | Cotter | | |

FOREIGN PATENT DOCUMENTS

WO   WO 2014/018539 A1   1/2014

* cited by examiner

*Primary Examiner* — Duc C Ho
(74) *Attorney, Agent, or Firm* — Finnegan, Henderson, Farabow, Garrett & Dunner, LLP (57) ABSTRACT

This disclosure relates generally to methods and systems for radio carriers management in a broadband wireless network. In one embodiment, a system for managing radio carriers in a network is provided. The system comprises a memory storing a set of instructions; and a hardware processor configured to execute the set of instructions to receive a trigger for radio carrier assignment determination for a mobile terminal; Upon receiving the trigger, to determine first traffic state information associated with the mobile terminal and second traffic state information associated with a plurality of radio carriers, and determine, based on the first traffic state information, whether to update carrier assignment for the mobile terminal; Upon determining to update carrier assignment for the mobile terminal, determine, based on the second traffic state information, one radio carrier from the plurality of radio carriers, and assign the one radio carrier to the mobile terminal for data communication.

20 Claims, 5 Drawing Sheets

FIG. 5: Example Computer System

METHODS AND SYSTEMS FOR RADIO CARRIERS MANAGEMENT IN A WIRELESS BROADBAND NETWORK

TECHNICAL FIELD

This disclosure relates generally to wireless communication, and more particularly to methods and systems for managing radio carriers in a wireless broadband network.

BACKGROUND

A 3GPP Long Term Evolution (LTE) network is a cellular network that consists of cells managed by base stations. The cells are typically associated with a particular geographic location. A user equipment (UE) located at a particular cell can use the cellular network by transmitting and receiving data to a base station (e.g., an eNodeB) that manages the cell. The UE may communicate with the base station using wireless signals associated with different frequency bands, with each frequency band being associated with a component carrier. For example, a UE and a base station typically communicate signaling data (e.g., radio resource control (RRC)) using a primary component carrier, and communicate other data using a secondary component carrier provided by the base station. When a single secondary component carrier is used for data communication, the data rate can be limited by the bandwidth of the single secondary component carrier frequency band. Radio resources can also become underutilized when other idle secondary component carriers are not used for the data communication.

To achieve high data rate required of LTE, 3GPP specification (TS 36.300 V10.12.0 Sections 5-7) proposes carrier aggregation (CA) as a method to solve the cell edge throughput problem. Under this scheme, a plurality of secondary component carriers can be aggregated for data communication for a particular UE, such that the UE can transmit data using the plurality of secondary component carriers. For example, two or more component carriers can be aggregated and a maximum aggregated system bandwidth of 100 MHz can be achieved with 1 PCC and 2 secondary component carriers.

With such an arrangement, the bandwidth of the wireless frequency band provided for data communication can be extended, leading to an improvement in the data rate. However, under the CA specification of 3GPP (e.g., TS 36.300 V10.12.0 Section 5.5), the determination of allowing an UE to use a secondary component carrier for data transmission does not take into account the load for that secondary component carrier (e.g., a number of UEs scheduled to use that carrier). Also, under current technologies, the determination also does not take into account the traffic load at the core network, nor the effect of downlink interference (e.g., caused by a neighboring base station) at the UE.

The inventors here have recognized several technical problems with such a method, as explained below. First, without taking the load for a secondary component carrier into consideration, there can be both overloading and underutilization the secondary component carriers as a result of carrier aggregation, when some of the secondary component carriers are heavily used by the UEs, while some of the secondary component carriers are idle. Second, without taking the traffic load at the core network (from which a base station receives data for transmission to the UEs) into consideration, it does not provide a mechanism for the base station to aggregate more secondary component carriers (when they are available) to increase the bandwidth available for transmitting the data received from the core network to the UEs. As a result, there can be excessive packet drops at the ingress port of that base station, because the base station cannot transmit the dropped packets to the UEs, leading to poor utilization of radio resources and poor network efficiency. Third, without taking the effect of downlink interference at an UE, it does not provide a mechanism to adjust the aggregation of secondary component carriers for that UE based on the interference, leading to high data error rate and poor network efficiency.

SUMMARY

Embodiments of the present disclosure present technological improvements as solutions to one or more of the above-mentioned technical problems recognized by the inventors in conventional systems. For example, in one embodiment, a system for managing radio carriers in a first network is provided. The system comprises a memory storing a set of instructions; and a hardware processor configured to execute the set of instructions to receive a trigger for radio carrier assignment determination for a mobile terminal. Upon receiving the trigger, the hardware processor may determine first traffic state information associated with the mobile terminal and second traffic state information associated with a plurality of radio carriers, and determine, based on the first traffic state information, whether to update carrier assignment for the mobile terminal. Upon determining to update carrier assignment for the mobile terminal, the hardware processor may determine, based on the second traffic state information, one radio carrier from the plurality of radio carriers, and assign the one radio carrier to the mobile terminal for data communication.

In another embodiment, a method for managing radio carriers in a first network is provided. The method may comprise: receiving a trigger for radio carrier assignment determination for a mobile terminal; upon receiving the trigger: determining first traffic state information associated with the mobile terminal and second traffic state information associated with a plurality of radio carriers, determining, based on the first traffic state information, whether to update carrier assignment for the mobile terminal, and upon determining to update carrier assignment for the mobile terminal: determining, based on the second traffic state information, one radio carrier from the plurality of radio carriers, and assigning the one radio carrier to the mobile terminal for data communication.

In yet another embodiment, a non-transitory computer readable storage medium is provided. The storage medium stores a program that, when executed by a computer, cause the computer to perform the aforementioned method for managing radio carriers in a first network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Illustrative embodiments of the present disclosure are listed below. In one embodiment, a system for managing radio carriers in a first network is provided. The system comprises a memory storing a set of instructions; and a hardware processor configured to execute the set of instructions to receive a trigger for radio carrier assignment determination for a mobile terminal. Upon receiving the trigger, the hardware processor may determine first traffic state information associated with the mobile terminal and second traffic state information associated with a plurality of radio carriers, and determine, based on the first traffic state information, whether to update carrier assignment for the mobile terminal, upon determining to update carrier assignment for the mobile terminal, the hardware processor may determine, based on the second traffic state information, one radio carrier from the plurality of radio carriers, and assign the one radio carrier to the mobile terminal for data communication.

Figure 1:
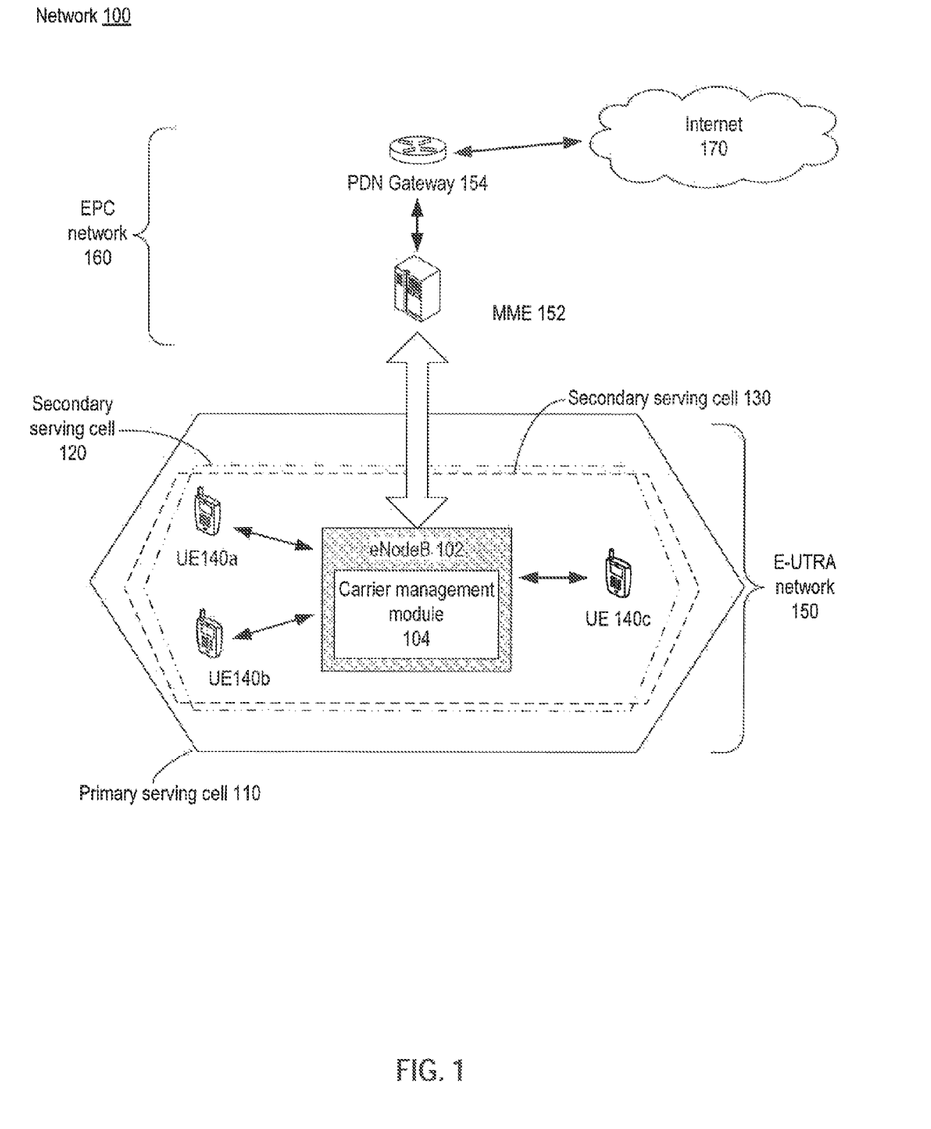
FIG. 1 illustrates an LTE wireless network in which embodiments of the present disclosure can be used.

FIG. 1 illustrates an LTE wireless network 100, in which embodiments of the present disclosure can be used. As shown in FIG. 1, LTE wireless network 100 includes a eNodeB 102 associated with a primary serving cell 110, and secondary serving cells 120 and 130. Each serving cell is associated with a component carrier 110a. For example, primary serving 110 can be associated with a primary component carrier 112, secondary serving cell 120 can be associated with a secondary component carrier 122, and secondary serving cell 130 can be associated with a secondary component carrier 132. ENodeB 102 can assign a combination of primary component carrier 112 and at least one of secondary component carriers 122 and 132 for data communication with UEs 140a, 140b, and 140c, all of which are in a coverage area managed by eNodeB 102. UEs 140a, 140b, and 140c may also communicate with each directly using D2D as defined in *Technical Specification Group Services and System Aspects; Proximity-based services (ProSe); Stage 2 (Release 12)* (http://www.3gpp.org/ftp/Specs/archive/23_series/23.303/23303-c50.zip), the content of which is incorporated herein by reference.

The base station eNodeB 102, together with UEs 140a, 140b, and 140c, can form an Evolved Universal Terrestrial Radio Access (E-UTRA) network 150.

Network 100 further includes Evolved Core Packet (EPC) network 160, which provides connectivity between eNodeB 102 and Internet 170. EPC network 160 can include a mobility management entity (MME) 152, which can provide functionalities including, for example, non access stratum, ciphering and integrity protection, inter core network signalling, SAE bearer control, handover, etc. EPC network 160 can also include a PDN gateway 154, which can provide functionalities such as packet filtering, mobile IP, policy enforcement, etc. EPC network 160 can include other components (not shown in FIG. 1) to provide other functionalities, such as lawful interception, packet routing and forwarding, transport level packet marking in the uplink and the downlink, accounting on user, provision of policy and charging rules function, policy enforcement decisions, subscriber information storage, etc.

ENodeB 102 can relay data between Internet 170 and an UE (e.g., any one of UEs 140a, 140b, and 140c) via EPC network 160. Each of the UEs can communicate with eNodeB 102 via a combination of primary component carrier 112, and at least one of secondary component carriers 122 and 132, when eNodeB 102 assigns the secondary component carriers to the UEs. As shown in FIG. 1, eNodeB 102 includes a carrier management module 104 configured to perform the assignment of the secondary component carriers to the UEs.

To maximize network efficiency, carrier management module 104 can manage the assignment of the secondary component carriers based on the various factors. For example, the assignment of the secondary component carriers can be based on the load of a particular component carrier. If a secondary component carrier is being (or scheduled to be) used by a large group of UEs (e.g., as revealed from the scheduling information at the media access control (MAC) layer), load sharing can be improved if that secondary component carrier is not further assigned to a UE outside the group, and network efficiency can be improved. Second, the assignment can also be based on the traffic load at EPC network 160. If eNodeB 102 receives from EPC network 160 a large volume of data targeted at, for example, e.g., UE 140a, eNodeB 102 can assign multiple secondary component carriers (e.g., secondary component carriers 122 and 132) for data transmission with UE 140a, so that a larger bandwidth can be allocated for the relaying of the data between EPC network 160 and UE 140a, to avoid excessive packet drop and to improve network efficiency. Third, the assignment can also be based on the downlink interference at the UE. Downlink interference can be specific for a location and for a particular component carrier. For example, if one of the UE (e.g., UE 140a) experiences severe downlink interference at a certain location for secondary component carrier 122, which can lead to date error if UE 140a uses that carrier for data communication with eNodeB 102, network efficiency can be improved if secondary component carrier 122 is not assigned to UE 140a for carrier aggregation.

Figure 2:
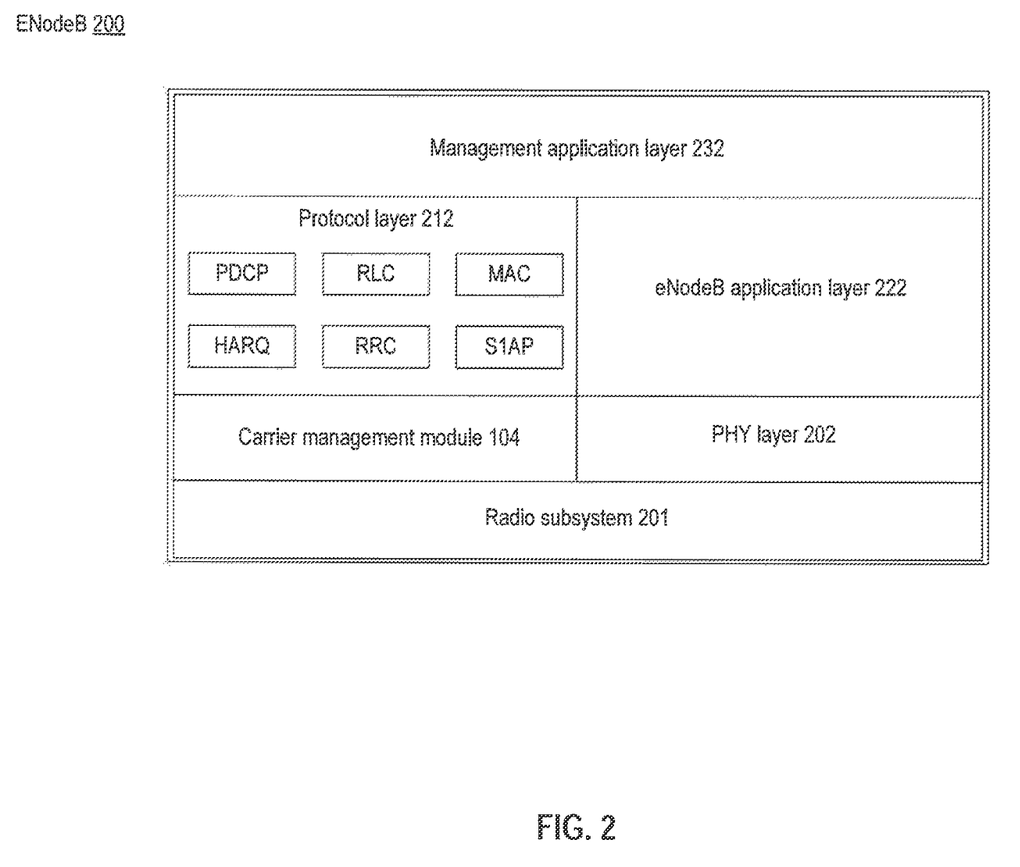
FIG. 2 is a functional block diagram of an exemplary eNodeB for carrier management according to some embodiments of the present disclosure.

FIG. 2 is a functional block diagram of an exemplary eNodeB 200 according to some embodiments of the present disclosure. In some embodiments, eNodeB 200 can be used to implement at least some of the functionalities of eNodeB 102 of FIG. 1. As shown in FIG. 2, eNodeB 200 can include carrier management module 104, a radio subsystem 201, a PHY layer 202, a protocol layer 212, an eNodeB application layer 222, and a management application layer 232.

For the purposes of this disclosure, "modules" and "layers" may be implemented in software, hardware, firmware, or mix thereof. For example, if the disclosed "modules" and "layers" are implemented in software, they may be stored in a memory. Processors, I/O devices, and memory devices may be used to perform processes to implement and facilitate operations of the modules. Thus, the modules and layers may include code instructions executable by one or more processors, alone or in various combinations with other modules and layers disclosed in this or other embodiments.

In some embodiments, radio subsystem 201 can include hardware, software and firmware used for communication with UEs. The hardware of radio subsystem 201 can include wireless transmitters, receivers, etc. Radio subsystem 201 may be configured to provide or support a primary component carrier, as well as one or more secondary component carrier, for data communication with the UEs. Radio subsystem 201 can be controlled by PHY layer 202, which may provide functionalities including, for example, OFDM modulation and coding, resource partitioning, multiplexing, etc. In some embodiments, PHY layer 202 includes components defined within 3*GPP Technical Specification Group Radio Access Network; Evolved Universal Terrestrial Radio Access (E-UTRA); Physical channels and modulation (Release* 10) (http://www.3gpp.org/ftp/Specs/archive/36_series/36.211/36211-a70.zip), 3*GPP Technical Specification Group Radio Access Network; Evolved Universal Terrestrial Radio Access (E-UTRA); Physical layer procedures (Release* 10) (http://www.3gpp.org/ftp/Specs/archive/36_series/36.213/36213-ac0.zip), the content of which is incorporated herein by reference.

In some embodiments, protocol layer 212 can be used to handle control and user plane protocols. Protocol layer 212 can include a Layer 2 Protocol Engine for handling of control and user plane protocols (e.g., PDCP, RLC, MAC) messages based on current state of the engine, providing header compression and encryption of user level IP packets, error recovery and flow control, hybrid automatic repeat request (HARQ), scheduling, etc. Protocol layer 212 can also include a Layer 3 Protocol Engine for handling of control plane protocols (e.g., RRC, S1AP) and user plane protocol messages (e.g., eGTP-U messages), session management, security, radio management, and mobility management.

RRC can provide functionalities including, for example, connection establishment and connection release, system Information broadcast, bearer establishment, reconfiguration, etc. RRC can also handle RRC mobility procedures, Paging notification and release and outer loop power control. RRM can work as a subset of RRC and can manage the RRC resources. RRM can also provide measurement configuration for measurement reports, and can process measurement reports received via RRC.

X2AP can be used to handle UE mobility. X2AP can provide functionalities including, for example, mobility management during handover, load management for load balancing, resetting X2 in the event of failure of system, setting up X2 for information transfer among base stations, eNodeB configuration update for updating the changes in the configuration.

PDCP can provide functionalities to user plane and control plane in wireless communication. These functionalities can include, for example, header compression and de-compression, in-sequence delivery of upper layers SDUs, duplicate detection of lower layer SDUs, PDCP SDUs retransmission at handover, ciphering and integrity protection, and control plane data transfer.

In some embodiments, protocol layer 212 can include components and functionalities defined within 3*GPP Technical Specification Group Services and System Aspects; General Packet Radio Service (GPRS) enhancements for Evolved Universal Terrestrial Radio Access Network (E-UTRAN) access (Release* 8) (http://www.3gpp.org/ftp/Specs/archive/23_series/23.401/23401-8g0.zip), 3*GPP Technical Specification Group Radio Access Network; Evolved Universal Terrestrial Ration Access (E-UTRA); Radio Resource Control (RRC); Protocol Specification (Release* 8) (http://www.3gpp.org/ftp/Specs/archive/36_sedes/36.331/36331-8h0.zip), and 3*GPP Technical Specification Group Radio Access Network; Evolved Universal Terrestrial Radio Access (E-UTRA); Medium Access Control (MAC) protocol specification (Release* 8) (http://www.3gpp.org/ftp/Specs/archive/36_series/36.321/36321-8c0.zip). The contents of the above-referenced documents are incorporated herein by reference.

ENodeB application 222 can provide functionalities including, for example, acceptance of an incoming call, final disposition of the call, mobility management, downlink scheduling, NBS function, Physical Cell ID (PCI) Configuration, minimization of drive test (MDT), etc.

As discussed before, carrier management module 104 can manage an assignment of the secondary component carriers based on the various factors including: a load of a particular component carrier, traffic load at a core network (e.g., EPC network 160 of FIG. 1), and downlink interference level at a UE. Carrier management module 104 can interact with other components of eNodeB 200 to perform the assignment. For example, carrier management module 104 can interface with a MAC scheduler of protocol layer 212 and with the transceivers and receivers of radio subsystem 201, to control which secondary component carrier to be used for a scheduled transmission or reception of data. For example, carrier management module 104 can interact with the MAC scheduler of protocol layer 212 and provide the assignment information, so that when the MAC scheduler schedules a communication task associated with a UE, it can allocate radio resources according to the assignment information (e.g., to allocate only the assigned secondary component carrier to the communication task).

In some embodiments, management application layer 232 can provide configuration data for eNodeB application 222, as well as carrier management module 104. Carrier management module 104 can perform an assignment of carrier components to the UEs based on at least some of the configuration data provided by management application layer 232. In some embodiments, the configuration data can include at least some of the following parameters: a number component carriers (including both primary and secondary component carriers) available for data communication (M); a timer parameter (T) which can be used to generate a triggering event for updating assignment of secondary component carriers; a target network efficiency (n) which can be used to represent a target network efficiency to be achieved (e.g., for a particular user, for a UE, etc.); a mean user load per carrier (p) which can be used to represent an average intended user load per carrier at an eNodeB. For example, if eNodeB 102 has a serving capacity of 60 UEs, and its radio subsystem (e.g., radio subsystem 201) can support three component carriers for data communication with the 60 UEs, the mean user load per carrier can be 20 (60/3).

Figure 3:
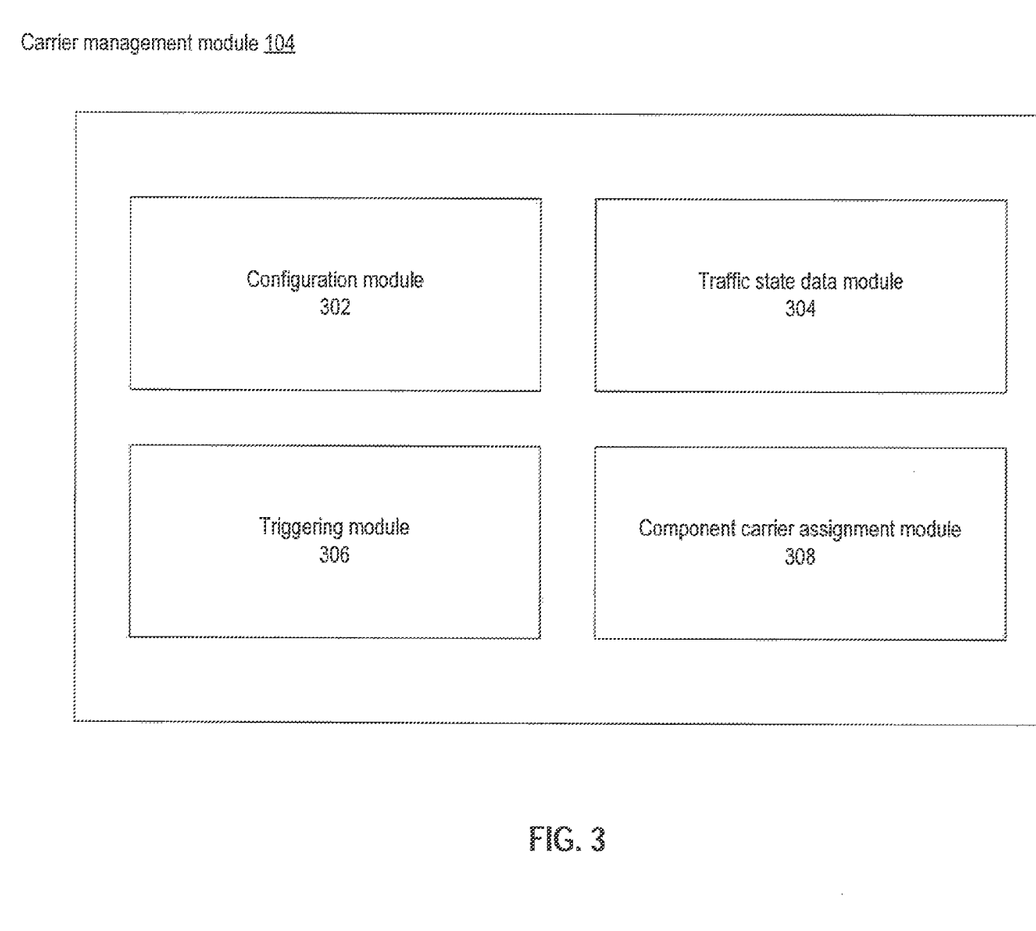
FIG. 3 is a functional block diagram of an exemplary carrier management module of the exemplary eNodeB of FIG. 2 according to some embodiments of the present disclosure.

Reference is now made to FIG. 3, which illustrates an exemplary functional block diagram of carrier management module 104 according to some embodiments of the present disclosure. As shown in FIG. 3, carrier management module 104 can include a configuration module 302, a traffic state data module 304, a triggering module 306, and a component carrier assignment module 308.

In some embodiments, configuration module 302 can be configured to store and maintain a set of environments and configuration parameters to be used by other modules of carrier management module 104. The configuration parameters can include, for example, number component carriers (M), timer parameter (T), target network efficiency (n), and mean user load per carrier (p). Configuration module 302 may receive these configuration parameters from management application layer 232 of FIG. 2.

In some embodiments, traffic state data module 304 can be configured to generate information related to a traffic state for each of the UEs in a coverage area associated with eNodeB 200. The traffic state information can be related to a traffic load associated with a UE at the core network (e.g., EPC network 160) and can include, for example, average ingress data rate measured at an ingress port of eNodeB 200. The ingress data rate can reflect a volume of data received by eNodeB 200, for that UE, from the core network through the ingress port. As discussed before, eNodeB 200 is configured as a relay between the core network and the UEs, and may drop data packets received from the core network if eNodeB 200 cannot transmit the data packets fast enough. Therefore, carrier management module 104 may assign more (or fewer) secondary component carriers to increase (or decrease) the bandwidth of data transmission from eNodeB 200 to a UE, based on the average ingress data rate for that UE. In some embodiments, traffic state data module 304 can acquire information about the average ingress data rate from eNodeB application layer 222 of FIG. 2. The ingress data rate can be measured in bits/second.

The traffic state can also include a measurement of downlink interference level (e.g., caused by a neighboring base station) of a secondary component carrier measured at a UE. Carrier management module 104 may determine to assign (or not to assign) a secondary component carrier based on the downlink interference level figure of that secondary component carrier. In some embodiments, the interference level can be reported by an UE in a Channel Quality Indication (CQI) report following RRC configuration, and traffic state data module 304 can acquire data for a measurement of downlink interference level from protocol layer 212 of FIG. 2.

The traffic state can also include other information, including average egress date rate associated with a UE, measured at an egress port of eNodeB 200. The egress data rate can reflect a volume of data eNodeB 200 transmits to that UE through the egress port. As to be discussed below, carrier management module 104 may generate information indicative of network efficiency based on the ingress data rate and the egress data rate.

The traffic state can also include information related to a radio resource utilization rate, which can be represented by a percentage of bandwidth of a particular secondary component carrier that is used for data communication. For example, if within a certain time period, only a certain band of a secondary component carrier is used, the radio resource utilization rate can be represented as a ratio between a bandwidth of that band being used during that time period, and the total bandwidth of the secondary component carrier available. In some cases, an average radio resource utilization rate can be determined based on a running average of the radio resource utilization rates determined for different time periods.

The traffic state information can also include information related to a user load for a particular secondary component carrier ($X_i$). The user load can reflect, based on the communication tasks scheduled at the MAC scheduler at protocol layer 212, a number of UEs scheduled to use that secondary carrier for the communication tasks. A user load can be associated a pre-determined observation window, and with each of the secondary component carriers provided or supported by radio subsystem 201 of FIG. 2. The observation window can be determined such that multiple samples of user load can be acquired within one trigger period associated with the timer parameter (T).

In some embodiments, triggering module 306 can trigger a start of the operations of various components of carrier management module 104, including traffic state data module 304 and component carrier assignment module 308. For example, based on the timer parameter (T) retrieved as part of the configuration data, triggering module 306 may set a periodic trigger based on the timer parameter (e.g., a period of T), and provide that trigger to traffic state data module 304 and component carrier assignment module 308, which may then operate based on the trigger. For example, as discussed before, traffic state data module 304 may acquire traffic state information, such as ingress data rate, egress data rate, downlink interference level, radio resource utilization rate, etc. The acquisition of these traffic state information can be controlled based on the trigger. Also, as to be discussed below, the assignment of the component carriers by component carrier assignment module 308 can also be controlled based on the trigger.

In some embodiments, component carrier assignment module 308 can determine to assign a secondary component carrier to a UE, which enables the UE to use that secondary component carrier (whether or not in combination with other secondary component carriers) for data communication. After receiving a trigger from triggering module 306, component carrier assignment module 308 may acquire traffic state information from traffic state data module 304, and determine an assignment of a secondary component carrier to the UE based on the traffic state information. Component carrier assignment module 308 can then provide the assignment information to the MAC scheduler, so that when the MAC scheduler schedules a communication task associated with a UE, it can allocate only the assigned secondary component carrier to that communication task.

Figure 4:
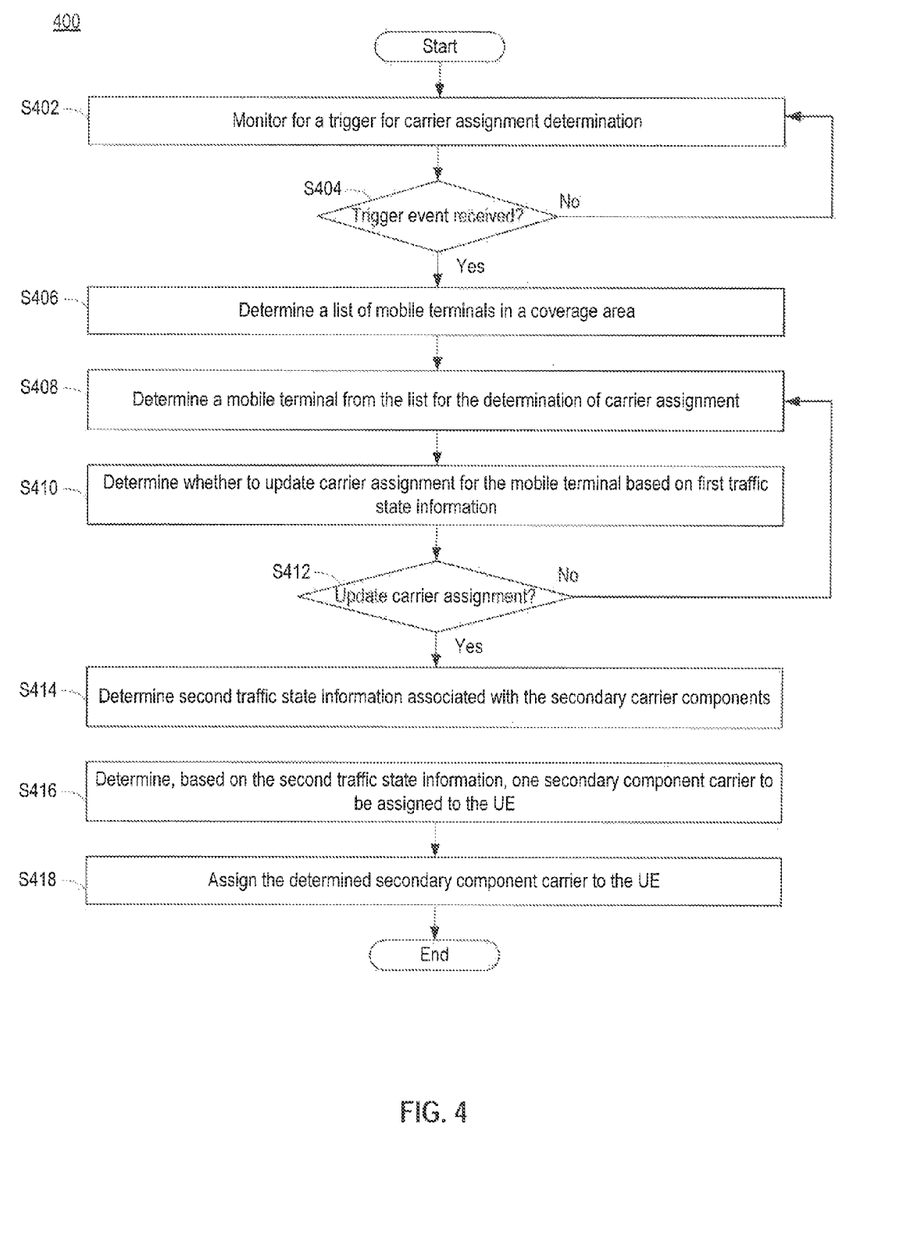
FIG. 4 is a flow diagram illustrating an exemplary method for carrier management according to some embodiments of the present disclosure.

Reference is now made to FIG. 4, which illustrates an exemplary method 400 for carrier management according to some embodiments of the present disclosure. In some embodiments, method 400 can be performed by a system included in (or associated with) an eNodeB (e.g., carrier management module 104 of FIG. 3).

After an initial state, the system may monitor for a trigger event for carrier assignment determination, in step S402. The trigger event can be generated, by triggering module 306, periodically based on a timer parameter (T) provided by configuration module 302 of FIG. 3.

If a trigger is received, in step S404, the system may proceed to determine a list of mobile terminals (e.g. UEs) in a coverage area associated with an eNodeB that includes (or associated with) the system, in step S406. The list of mobile terminals can be determined based on one or more prior hand-shakes between the eNodeB and the mobile terminals. In step S408, the system may determine one mobile terminal form the list for the determination of carrier assignment. The determination can be based on, for example, according to an order by which the mobile terminals are listed in the list, or based on other criteria.

After determining one mobile terminal for carrier assignment determination, the system may then proceed to step S410 to determine, based on first traffic state information, whether to update carrier assignment for the mobile terminal determined in step S408. The first traffic state information can include, for example, egress and ingress data rate for that UE generated by traffic state data module 304. The determination of whether to update carrier assignment can be based on the first traffic state information, as well as configuration data provided by configuration module 302.

For example, the system may determine a network efficiency associated with a UE based on a ratio between an egress data rate and an ingress data rate for data associated with the UE. As discussed before, the egress and ingress data rate can be obtained by traffic state data module 304. The ratio can then be compared against a target network efficiency (q) provided by configuration module 302. If the network efficiency associated with a UE is less than the target network efficiency, the system may determine, in step S412, to update carrier assignment for that UE. On the other hand, if the network efficiency associated with the UE equals to or exceeds the target network efficiency, the system may proceed back to step S408 to determine the next mobile terminal from the list for carrier assignment determination.

If the system determines to update carrier assignment for the UE in step S412, the system may proceed to step S414 to determine second traffic state information associated with each of the secondary component carriers supported by the radio subsystem 201 at eNodeB 200. The second traffic state information can include: downlink interference level associated with a secondary component carrier reported by the UE, and average radio resource utilization rate for that secondary component carrier (e.g., based on a percentage of bandwidth of that secondary component carrier that is used for data communication). The system may also generate, as part of second traffic state information, a statistical value of user load for the secondary carrier component. The statistical value can be generated based on a number of samples of user load for the secondary carrier component ($X_i$) acquired within a trigger period associated with the timer parameter (T), and the mean user load per carrier (i) stored as part of the configuration data. As an illustrative example, the statistical value can be a standard deviation calculated as follows:

$$\text{user\_load\_standard\_deviation} = \sqrt[2]{\frac{\Sigma_{i=0}^{T}(x_i - \mu)^2}{T}} \quad (1)$$

The system may generate the second state traffic information for each of the secondary component carriers supported by the radio subsystem 201 at eNodeB 200.

After determining the second state traffic information associated with each of the supported secondary component carriers in step S414, the system may proceed to step S416 to determine to assign one of the supported secondary component carriers to the UE, based on the second state traffic information. For example, the system may calculate an index, for each of the secondary component carrier, based on the following formula:

$$\text{index} = \text{average radio resource utilization rate} * \text{user\_load\_standard\_deviation}^{downlink\_interference\_level} \quad (2)$$

For example, the value of the index may be relatively large for a secondary component carrier that is associated with a high average radio resource utilization rate (which may indicate that a large portion of the bandwidth of the carrier has already been used), a high user load standard deviation (which may indicate large fluctuations in the user load) and a high downlink interference level.

After the indexes are calculated for each of the secondary component carriers, the system may determine that the secondary component carrier associated with the lowest index value to the UE is to be assigned to the UE. The system may then proceed to step S418 and assign the determined secondary component carrier to the UE.

Computer System

Figure 5:
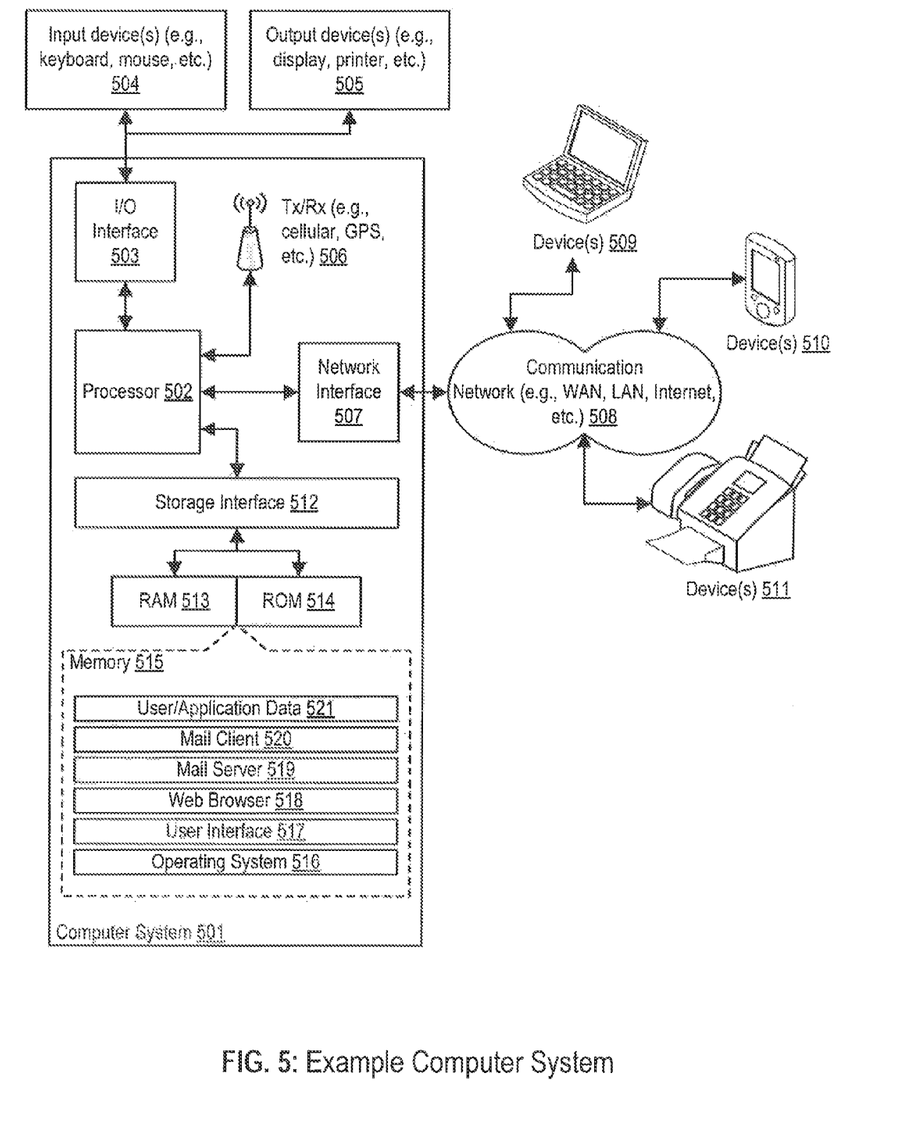
FIG. 5 is a block diagram of an exemplary computer system for implementing embodiments consistent with the present disclosure.

FIG. 5 is a block diagram of an exemplary computer system for implementing embodiments consistent with the present disclosure. Variations of computer system 501 may be used for implementing the devices and systems disclosed herein. Computer system 501 may comprise a central processing unit ("CPU" or "processor") 502. Processor 502 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WIMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/Vintemet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described methods and systems for carriers management in a broadband network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for managing radio carriers in a first network, the system comprising:
    a memory storing a set of instructions; and
    a hardware processor configured to execute the set of instructions to:
        receive a trigger for radio carrier assignment determination for a mobile terminal;
        upon receiving the trigger:
            determine first traffic state information associated with the mobile terminal and second traffic state information associated with a plurality of radio carriers,
            determine, based on the first traffic state information, whether to update carrier assignment for the mobile terminal, and
            upon determining to update carrier assignment for the mobile terminal:
                determine, based on the second traffic state information, one radio carrier from the plurality of radio carriers, and
                assign the one radio carrier to the mobile terminal for data communication.

2. The system of claim 1, wherein the first traffic state information include information related to a network efficiency associated with the mobile terminal, and the second traffic state information include information related to at least one of: average radio resource utilization rates associated with the plurality of radio carriers, downlink interference levels associated with the plurality of radio carriers, and user loads associated with the plurality of radio carriers.

3. The system of claim 2, wherein the network efficiency associated with the mobile terminal is related to a ratio between a first data rate and a second date rate, the first data rate being a rate of transmitting, by the base station to a second network, the data associated with the mobile terminal, and the second date rate being a rate of receiving, by a base station, data associated with the mobile terminal.

4. The system of claim 3, wherein the determination to update carrier assignment for the mobile terminal is based on a determination that the network efficiency associated with the mobile terminal is below a target network efficiency.

5. The system of claim 2, wherein the one radio carrier is determined based on the average radio resource utilization rate associated with the one radio carrier and the downlink interference level associated with the one radio carrier.

6. The system of claim 5, wherein the hardware processor is further configured to execute the set of instructions to:
    determine a statistical value associated a user load associated with the one radio carrier;
    wherein the one radio carrier is determined based on the statistical value associated with the one radio carrier.

7. The system of system of claim 1, wherein the hardware processor is configured to execute the set of instructions to perform radio resource allocation to the mobile terminal based on the assignment of the one radio carrier to the mobile terminal.

8. A method for managing radio carriers in a first network, comprising:
    receiving a trigger for radio carrier assignment determination for a mobile terminal;
    upon receiving the trigger:
        determining first traffic state information associated with the mobile terminal and second traffic state information associated with a plurality of radio carriers,
        determining, based on the first traffic state information, whether to update carrier assignment for the mobile terminal, and
        upon determining to update carrier assignment for the mobile terminal:
            determining, based on the second traffic state information, one radio carrier from the plurality of radio carriers, and
            assigning the one radio carrier to the mobile terminal for data communication.

9. The method of claim 8, wherein the first traffic state information include information related to a network efficiency associated with the mobile terminal, and the second traffic state information include information related to at least one of: average radio resource utilization rates associated with the plurality of radio carriers, downlink interference levels associated with the plurality of radio carriers, and user loads associated with the plurality of radio carriers.

10. The method of claim 9, wherein the network efficiency associated with the mobile terminal is related to a ratio between a first data rate and a second date rate, the first data rate being a rate of transmitting, by the base station to a second network, the data associated with the mobile terminal, and the second date rate being a rate of receiving, by a base station, data associated with the mobile terminal.

11. The method of claim 10, wherein the determination to update carrier assignment for the mobile terminal is based on a determination that the network efficiency associated with the mobile terminal is below a target network efficiency.

12. The method of claim 9, wherein the one radio carrier is determined based on the average radio resource utilization rate associated with the one radio carrier and the downlink interference level associated with the one radio carrier.

13. The method of claim 12, further comprising:
    determining a statistical value associated a user load associated with the one radio carrier;
    wherein the one radio carrier is determined based on the statistical value associated with the one radio carrier.

14. The method of claim 13, further comprising: performing radio resource allocation to the mobile terminal based on the assignment of the one radio carrier to the mobile terminal.

15. A non-transitory computer readable storage medium storing a program that, when executed by a computer, cause the computer to perform a method for managing radio carriers in a first network, the method comprising:
    receiving a trigger for radio carrier assignment determination for a mobile terminal;

upon receiving the trigger:
- determining first traffic state information associated with the mobile terminal and second traffic state information associated with a plurality of radio carriers,
- determining, based on the first traffic state information, whether to update carrier assignment for the mobile terminal, and
- upon determining to update carrier assignment for the mobile terminal:
  - determining, based on the second traffic state information, one radio carrier from the plurality of radio carriers, and
  - assigning the one radio carrier to the mobile terminal for data communication.

16. The medium of claim 15, wherein the first traffic state information include information related to a network efficiency associated with the mobile terminal, and the second traffic state information include information related to at least one of: average radio resource utilization rates associated with the plurality of radio carriers, downlink interference levels associated with the plurality of radio carriers, and user loads associated with the plurality of radio carriers.

17. The medium of claim 16, wherein the network efficiency associated with the mobile terminal is related to a ratio between a first data rate and a second date rate, the first data rate being a rate of transmitting, by the base station to a second network, the data associated with the mobile terminal, and the second date rate being a rate of receiving, by a base station, data associated with the mobile.

18. The medium of claim 17, wherein the determination to update carrier assignment for the mobile terminal is based on a determination that the network efficiency associated with the mobile terminal is below a target network efficiency.

19. The medium of claim 16, wherein the one radio carrier is determined based on the average radio resource utilization rate associated with the one radio carrier and the downlink interference level associated with the one radio carrier.

20. The medium of claim 19, wherein the method further comprises:
- determining a statistical value associated a user load associated with the one radio carrier;
- wherein the one radio carrier is determined based on the statistical value associated with the one radio carrier.

* * * * *

UNITED STATES PATENT AND TRADEMARK OFFICE
CERTIFICATE OF CORRECTION

| | | |
|---|---|---|
| PATENT NO. | : 9,788,325 B2 | |
| APPLICATION NO. | : 15/070746 | |
| DATED | : October 10, 2017 | |
| INVENTOR(S) | : Saptarshi Chaudhuri | |

It is certified that error appears in the above-identified patent and that said Letters Patent is hereby corrected as shown below:

On the Title Page

Abstract, Line 8, "Upon" should read as --upon--.

Abstract, Line 13, "Upon" should read as --upon--.

In the Claims

Claim 2, Column 13, Line 43, "include" should read as --includes--.

Claim 9, Column 14, Line 30, "include" should read as --includes--.

Claim 9, Column 14, Line 32, "include" should read as --includes--.

Claim 16, Column 15, Line 17, "include" should read as --includes--.

Claim 16, Column 15, Line 19, "include" should read as --includes--.

Signed and Sealed this
First Day of May, 2018

Andrei Iancu
*Director of the United States Patent and Trademark Office*